United States Patent [19]

Schiller et al.

[11] Patent Number: 5,050,103
[45] Date of Patent: Sep. 17, 1991

[54] METHOD FOR DISPLAYING KANJI CHARACTERS

[75] Inventors: Stephen N. Schiller, Menlo Park; William H. Paxton, Los Altos Hills, both of Calif.

[73] Assignee: Adobe Systems Incorporated, Mountain View, Calif.

[21] Appl. No.: 351,668

[22] Filed: May 12, 1989

[51] Int. Cl.$^5$ .............................................. G06F 15/60
[52] U.S. Cl. ...................................................... 364/521
[58] Field of Search ... 364/518, 521, 523, 419 MS File, 364/200 MS File, 900 MS File; 340/731, 735, 790

[56] References Cited

U.S. PATENT DOCUMENTS

| | | | |
|---|---|---|---|
| 4,675,830 | 6/1987 | Hawkins | 364/518 |
| 4,785,391 | 11/1988 | Apley et al. | 364/518 |
| 4,907,282 | 3/1990 | Daly et al. | 364/518 X |
| 4,959,801 | 9/1990 | Apley et al. | 364/518 |

OTHER PUBLICATIONS

Hersch, Roger D., Character Generation Under Grid Constraints, Computer Graphics, vol. 21, No. 4, Jul. 1987, pp. 243-252.

*Primary Examiner*—Gary V. Harkcom
*Assistant Examiner*—Mark K. Zimmerman
*Attorney, Agent, or Firm*—Roger S. Borovoy

[57] ABSTRACT

A method for displaying characters on a screen or printer, particularly kanji characters. The structure of the character is represented by stems and counters, both vertical and horizontal, the counters being the spaces between stems. The character is then adjusted to be displayed. Either the horizontal or vertical counters are grouped into a first chain of counters. The non-integral counter widths of this chain are adjusted in relation to the other counter widths within the chain, selected counter widths being made equal to others within the chain in order to most faithfuly reproduce the desired character. The remaining horizontal or vertical counters, if any, are also grouped into one or more series of chains which are also adjusted, chain by chain. Then the other set of counters are adjusted in the same way.

9 Claims, 3 Drawing Sheets

WIDTHS SORTED BY FRACTIONAL PARTS

| | |
|---|---|
| 2.4 | STEM #1 ($W_2$) |
| 2.3 | STEM #2 ($W_3$) |
| 2.6 | STEM #3 ($W_1$) |
| 2.1 | STEM #4 ($W_4$) |
| 3.9 | STEM #5 |
| PIXELS | |

METHOD FOR DISPLAYING KANJI CHARACTERS

BACKGROUND OF THE INVENTION

This invention relates to an improved method of displaying characters, with particular advantage when used to display Chinese and Japanese kanji characters. Such display may be on a cathode ray tube (CRT) display or on a printed page. Display of English alphanumeric characters is much less of a problem because, for the most part, alphanumeric characters are made up of few strokes, and mainly strokes of the same width. With kanji characters, on the other hand, each character requires many more strokes and the width of the strokes also varies, as does the width of the spaces between the strokes. Moreover, these variations occur in both the horizontal and in the vertical direction.

The problem in displaying kanji characters is that displays are limited to a fixed pixel grid. This is true both for bit-mapped CRT displays and for raster printers which store the characters to be printed in a raster memory, which is equivalent to a bit-mapped display. The original character is usually designed on a fixed grid and thus all stroke borders precisely fit the grid. This original grid, called "character space", is usually much larger than the space on the display device on which the character ultimately will be displayed, since many characters are displayed on a screen or page simultaneously. Thus much more detail can be contained in the original character definition. However, this fixed character design must then be translated to fit the available number of pixels on the display device which will be allocated to that character. A single character is usually only a tiny fraction of the display space of the display device.

If the character to be displayed, once reduced to the display grid, happens by chance to fit the grid of pixels perfectly, there is no problem. However, where character stroke edges end within a line of pixels, a decision must be made either to include that entire line or to exclude it. Techniques used in the past for making that determination are called outline phase control, which is a kind of rounding technique used to determine whether or not to include a line of pixels for the line to be displayed, or to exclude it. With kanji characters, since this decision is made automatically, what often happens is that one vertical or horizontal stroke boundary is rounded upwardly, making a slightly wider line, and another nearby line, parallel to the first, may be rounded downwardly, making a slightly narrower line. When displayed, the difference between these two lines viewed next to each other can be noticeable.

The original design of the character on a fixed grid, however, often has slight differences between these widths of character stems. The spaces between these stems also vary somewhat. Then the character is converted to display space, creating non-integral boundaries which don't it the pixel grid. If stem widths and the spaces between them are rounded randomly the displayed character won't look like the original character design.

The prior art dealt with this problem as set forth in U.S. Pat. No. 4,785,391. The technique of that patent employs a system of pixel assignment within hierarchical zones. The system looks at the first zone and assigns a certain number of pixels to that zone. Then that zone is divided into two or more zones, and the originally allocated number of pixels is divided between the two or more zones. Then, hierarchically, each of these two or more zones are each divided into two or more subzones and each of the subzones assigned a number of pixels. The total number of pixels in any group of subzones must add up to the number in the zone from which they were divided.

The problem which had to be solved by this prior art technique is that, in the design of a kanji character, certain subzones, or sub-sub-zones had to look like other sub- or sub-sub-zones of the character. These "look-alike" zones had to be identified initially. Then, in the subdivision process, the identity of these predetermined look-alikes has to be retained so that the same number of pixels would be used for the look-alike zones or subzones. This equating process had to be propagated up and down the subdivision tree. Accordingly, this hierarchy of zones, subzones and predetermined equality had to be built into the original algorithmic description of each character.

The first problem with this prior art approach is in the need to generate the hierarchy in the first place. With alphanumeric characters, this wasn't a big problem since there are essentially only 36 characters (plus symbols), in comparison to kanji which has more than 7000 regularly used, very complex characters. The character designer must laboriously construct the hierarchy for each of these 7000 kanji characters. And most kanji characters are much more complicated than any alphanumeric character. Even assuming that an algorithm could be developed to do some of this hierarchy development by computer, the character designer still will need to look at each character manually to check visual consistency, and much manual work is still necessary. Further, all this hierarchical information must be stored along with the character outline, using up considerable extra quantities of scarce memory space, particularly when there already are 7000 character designs to be stored.

Moreover, using the prior art hierarchical technique for kanji is much more difficult than for alphanumeric characters. Alphanumeric characters lend themselves to being subdivided into a single hierarchy of zones for the vertical direction and another for the horizontal direction. Kanji characters, however, do not readily lend themselves to such division, often requiring multiple vertical or horizontal hierarchies of zones for proper definition. The prior art algorithm is much more difficult to apply in cases of multiple hierarchical zones, and in some cases, it will fail.

SUMMARY OF THE INVENTION

This invention provides a character definition technique which avoids the need to define hierarchical zones, but instead relies principally upon the already available locations of the character strokes in the character design, from which "stems" and "counters" may be derived. A stem in a character is a vertical or a horizontal bar making up a portion of the character. For example the crossbar in the letter "A" is a typical stem. A counter is defined by two stems and the horizontal or vertical space between them. A counter width is the space between the stems. For example, the spaces between the vertical stems of the letter "H" are counters. In a preferred embodiment of the invention, the stem widths of a character which has been transformed from its original definition coordinates in "character space", to the size at which it will ultimately be displayed by the display device, or "device space", first are adjusted. All stem borders are adjusted and rounded according to the method of the invention to fit the pixel array of the device space.

The method of the invention for regularizing characters for display then makes calculations from the character dimensions in display space to determine the counter widths between the adjusted stems, and rounds the non-integral counter widths in relation to other counter widths to permit the most faithful character reproduction.

Briefly, the method for displaying characters of the invention begins by representing the structure of a character by a plurality of vertical and horizontal stems, these stems being derived from the character definition. The width of these stems are adjusted in device space and the integral widths rounded to preserve width similarities among the horizontal stems and the vertical stems. Next, the counters between these vertical and horizontal stems are grouped into chains of vertical and horizontal counters. The group having the most counters forms the first chain. As each chain is determined, the counter widths within that chain are adjusted relative to other counter widths within the same chain, rounding non-integral counter widths and making selected counter widths equal to others within the same chain in a manner to most faithfully reproduce the regularities of the desired character. Once the counter widths of a chain are determined, they remain fixed for the construction of the entire character to be displayed.

DETAILED DESCRIPTION OF THE INVENTION

Figures 1, 2:
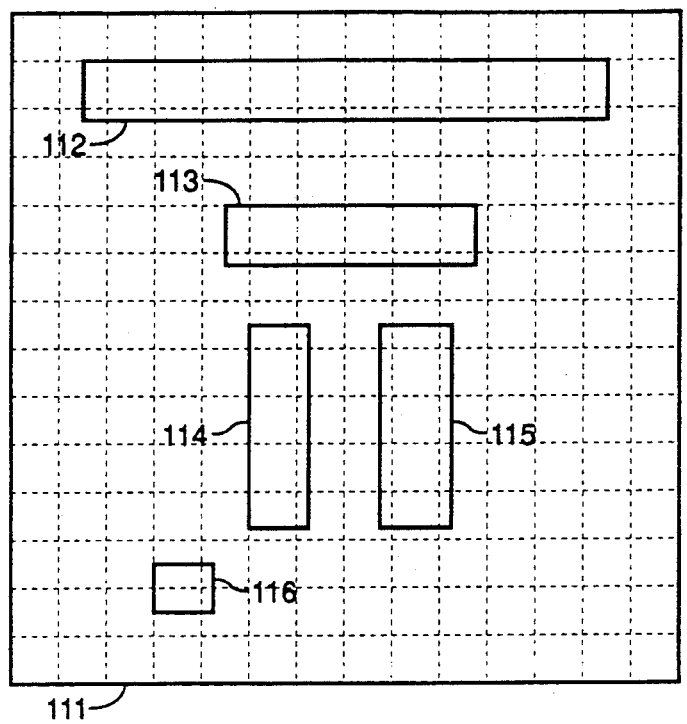
FIG. 1 is an illustration showing how a character is transferred from character space to device space.
FIG. 2 shows a representative series of stems to illustrate the method of stem width adjustment of the invention.

FIG. 1 shows a representative character in device space on a 14×14 unit grid 111. The character was much larger when designed in character space. For illustration, assume the top horizontal bar 112 was seven hundred units long in character space. Character design is usually done in even units on a fixed grid. Typically, character space is a matrix of 1000×1000 units, but the exact size of this matrix may vary among designs and is a matter of choice.

Characters are not finally displayed in character space. They are displayed on printers and cathode ray tubes (CRTs). Inconveniently, these displays are not square grids of 1000×1000 pixels, but are rectangular in shape, such as 1280×1024 pixels or 1024×768 pixels. Moreover, a single character is displayed on only a small part of the screen or printed page, perhaps only on a matrix of 40×40 or 20×20 pixels. On the 14×14 pixel display device shown as grid 111 in FIG. 1, stems 112-116 must have been contracted proportionately from their size in character space by a factor of 14/700 to fit a 14×14 grid. Note that bar 112 does not fall directly on the grids of device space grid 111, but its edges fall between grids (or pixels if this were a 14×14 pixel array). It is not possible to illuminate a fraction of a pixel. Therefore a decision must be made, for each pixel partially covered by bar 112, whether it should be illuminated or not. This "rounding" problem is what is dealt with in this invention.

Figure 5:
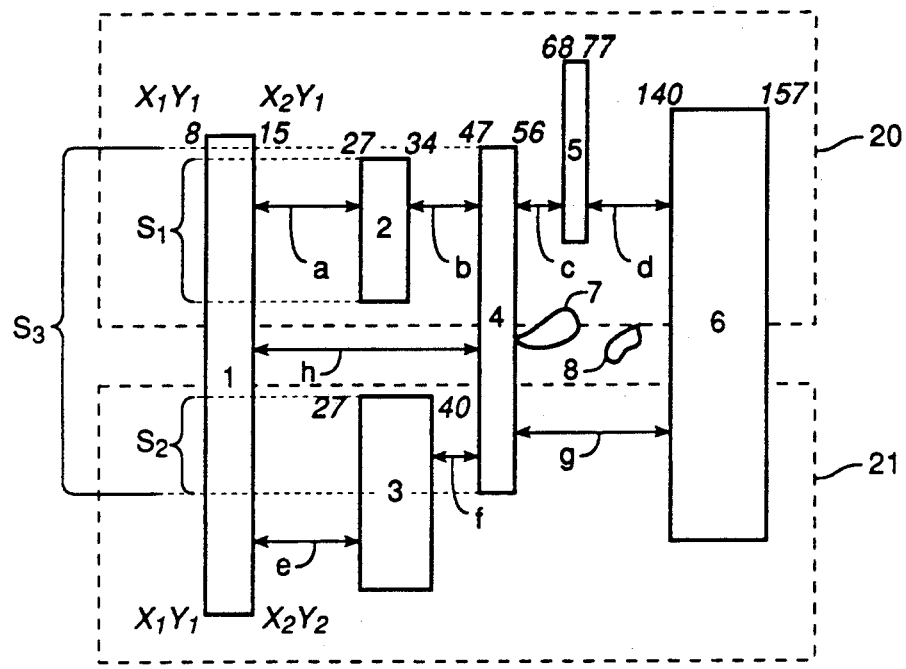
FIG. 5 is a representative, fictitious kanji character illustrating the method of the invention.

Typically, the method of this invention is carried out by a digital computer. This computer recognizes all the X-coordinate pairs of each of the vertical stems and the Y-coordinates of the horizontal stems. These are specifically identified as stem coordinates in the character definition, in what are called "hints". Once the stem coordinate pairs are established, it is a simple matter of subtraction to establish the X-coordinate pairs for the horizontal and vertical counters. Referring to FIG. 5, for example, counter a has X-coordinates $X_1=15$; $X_2=27$. Counter b has X-coordinates 34,47; counter c has X-coordinates 56,68; counter d has X-coordinates 77,140; counter e has X-coordinates 15,27; counter f has X-coordinates 40,47; counter c has X-coordinates 56,140; and counter h has X-coordinates 15,47.

The first step in the method of the invention, after the character is converted from character space to device space, is to adjust the stem widths to most faithfully represent the original character. After conversion to device space, the stem widths of the character are most likely expressed as an integer plus a decimal fraction of a pixel. These decimals must be rounded to integers in accordance with the techniques of this invention to be described.

The technique for determining stem widths in display space varies with the type of font being used. Both Roman and kanji characters are displayed in many fonts, such as Gothic, Ryumin, and others. Some fonts, such as Gothic, lend themselves to stems which are rounded upwardly, so that if a dividing line happened to fall precisely between pixels, one opts for the larger size. Other fonts look better when rounded down. This choice is made in advance, and either way is satisfactory for the invention. If desired, this choice may even be made on a character-by-character basis.

For example, let's look at stem widths in device space between 2.0 and 3.0 pixels. Using a font which is rounded up, if the width of any member of a group of stems in device space falls between 2.5 and 3.0 pixels, these stem widths are rounded up to 3.0 pixels. If there is no such stem whose width is equal or above 2.5 pixels, which is the midpoint between 2 and 3 pixels, all stem widths between 2.0 and 3.0 pixels get rounded down to 2.0 pixels. If there is at least one stem equal to or above 2.5 pixels in width, a constant adder, k, is used to aid in the determination of rounding. This adder is selected by the practitioner for the font being used, and may vary from 0.1 to 0.3. An adder of 0.3 works well for most fonts.

If the width of a stem exceeding 2.5 units (if there are more than one such stem, the one closest to 2.5 units is chosen) is greater than 2.5 units plus the constant k (2.5+k), then all the stem widths equal or above (2.5+k) pixels will be rounded up; those below will be rounded down. For example, suppose that k=0.3 pixels. If the only stem width greater than 2.5 pixels, or the stem width greater than and closest to 2.5 pixels (where more than one stem has a width in excess of 2.5 pixels), were 2.9 pixels, than all stems having a width greater than or equal to 2.8 pixels (2.5+0.3) will be rounded up. Those below 2.8 pixels will be rounded down. Since the stem width of 2.9 pixels was the closest stem above 2.5 pixels in this example, by definition, there must be a blank space with no stems having widths between 2.5 and 2.9 pixels.

The process is somewhat different if there are one or more stems having widths between 2.5 and 2.8 pixels in the above example. First you take the closest stem width, $w_1$, above 2.5 pixels (2.5 is selected because it is half way between 2 and 3 pixel integral units) but still within the integral pixel units 2 and 3. Then you find the next smaller stem width, termed $w_2$, below $w_1$ (which must, therefore, be less than 2.5 pixels since w: was the closest stem width above 2.5), but still above 2.0 pixels. If $w_2$ is less than $(2.5-k)$, it is always rounded down. If $w_2$ is greater than or equal to $(2.5-k)$, the decision to round up or not is determined by whether $w_2$ is greater than or equal to $w_1 \times (2.5/(2.5+k))$. This test is applied to all stem widths below $w_1$ and between the pixels integers 2 and 3, which are less than 2.5 pixels, one after the next, until all decisions are completed. The purpose of this test is to insure that a stem only gets larger as the scale factor is increased.

Each successive stem width is compared in the equation with its immediately preceding, larger width. Thus if the next stem width is $w_3$ and $w_3$ is greater than or equal to $(2.5-k)$, that width $w_3$ is compared to $w_2 \times (2.5/(2.5+k))$ to decide whether to round up or down. If $w_3$ is greater, you round up; if lesser, round down.

It will be understood by those skilled in the art that if a font is to be rounded down instead of up, these same procedures are applicable except the process of rounding is the mirror image of rounding up, since "up" and "down" are reversed but the process to get there is essentially the same.

Figure 3:
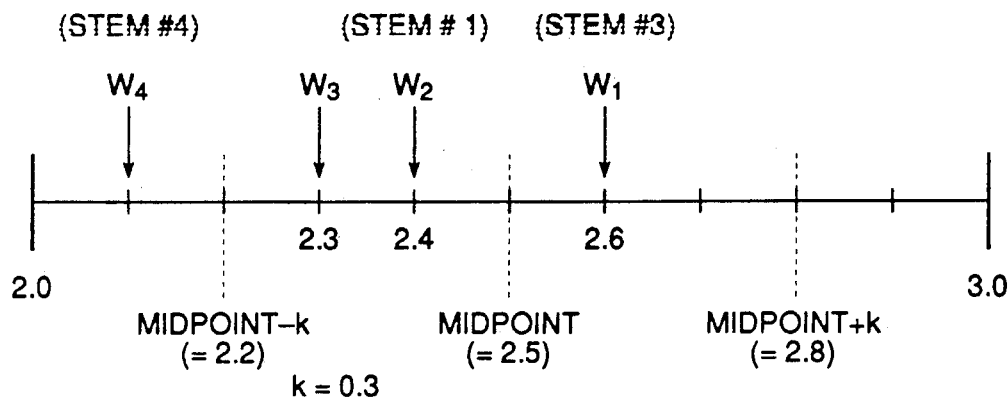
FIG. 3 is a graph showing the stem widths of FIG. 2.

An example of these decisions is illustrated in FIG. 2, a fictitious character having four horizontal stems. Stem #1 has a width of 2.4 pixels; stem #2 is 2.3 pixels, stem #3 is 2.6 pixels; stem #4 is 2.1 pixels and stem #5 is 3.9 pixels. These widths are also shown in the graph of FIG. 3. Let us assume that the font being used is Gothic and therefore we have decided to round up. Furthermore, we only look at stems having widths within a single unit pixel, so assuming we are first rounding the stems between 2 and 3 pixels wide, we ignore stem 5 which is 3.9 pixels wide (this may be looked at later if there are multiple stems between 3 and 4 pixels wide). First, we look at stems greater than half way between 2 and 3 pixels—those stems which are 2.5 pixels wide or greater. There is one such stem in FIG. 2, with a width of 2.6 pixels. That stem, according to the procedure, is rounded up to 3.0 pixels.

Next, you find the smallest stem of width $w_1$ above and closest to the midpoint of 2.5 pixels, which in this example is stem #3 having a width of 2.6 pixels. Since 2.6 is less than $(2.5+k)=2.8$ then $w_1=2.6$. Now you find pixel width $w_2$, which is the next smallest stem width smaller than $w_1$. In this example, $w_2$ is stem #1 having a width of 2.4 pixels. To determine whether you round $w_2$ up or down, you first check whether $w_2$ is less than $(2.5-k)$. $(2.5-k)=2.2$, and $w_2=2.4$, so that test fails since $w_2$ is not less than 2.2 pixels. Therefore you do the second test to determine if $w_2$ is greater than or equal to $w_1 \times (2.5/(2.5+k))$. $w_1=2.6$; $2.5/2.8=0.89$; $2.6\times 0.89=2.32$. Since $w_2=2.4$, which is greater than 2.32, rounded up.

You continue in order of smaller stem widths. The next smaller stem width is stem #3 which is 2.3 pixels. Since $w_3$ again is greater than 2.2 pixels, the second comparison must be made. In this case $w_3$, which is 2.3 pixels, also is greater than $w_2 \times (2.5/(2.5+k))$, or 2.14, so it also is rounded up.

The last stem, #4, has a width of 2.1 pixels. That is less than 2.2, e.g. $(2.5-k)$, pixels. Therefore, according to the method of the invention, it must be rounded down.

After the stem widths have been rounded as set forth above for all of the stems of the character, it is then necessary to look at the counter widths.

The first step in determining counter widths according to the invention is to initially establish the counters by setting the stem widths as discussed above and pairing the stems. A counter is defined by a pair of stems and a counter width is the distance between them. Referring to FIG. 5, the illustrative kanji character (no actual character actually exists having the illustrated combination of elements) is made up of six stems 1-6. The counter widths between the stems are identified by the letters a, b, c, d, e, f, g and h. In establishing counters, all possible pairs of stems in the character are looked at. The method of the invention next eliminates counters from further consideration. FIG. 5 specifically illustrates eight stem pairs which make up eight counters, including five vertical stems 1, 2, 4, 5 and 6 and the intervening four vertical counters a, b, c, and d, and four other vertical stems 1, 3, 4 and 6, and the four intervening vertical counters e, f, g, and h. It will be understood that there are twenty-eight possible counters, including, for example, the counter between stems 1 and 6, stems 3 and 6, and so forth, but for simplicity, these have been ignored in this illustration. As will be obvious from the discussion which follows that these counters will be eliminated by the process to be described.

Many characters not only have vertical stems and counters, but horizontal stems and counters as well. The same procedure of this invention must be employed with respect to the horizontal stems and counters as will be illustrated here for the vertical stems and counters. The procedure for horizontal stem and counters will be discussed later in connection with FIG. 6, and is carried out separately from the vertical counters.

Using the $X_1,X_2$ values for each of the stems identified in the hints for the character, the $Y_1,Y_2$ values can be ascertained from the original character definition. These $Y_1,Y_2$ values for each of the stems are used to determine the extent that adjacent stems overlap one another. The extent of this overlapping of stem pairs is used as a parameter to determine whether or not these stem pairs and their included counter are to be used or eliminated. "Extent of overlap" is measured by determining how much of the Y range of the shorter stem is common to the corresponding range of the longer stem of an overlapping pair. The required extent of overlap to include a counter is left to the discretion of the practitioner. Overlap ranges between about 40% and 75% are useable in the invention, preferably near 50%. For example, using a 50% overlap criterion, any stem which does not overlap any other stem in the group by more than 50% will be excluded. This percentage may, if desired, be determined on a character-by-character basis and be part of the character definition included in the hints for the character.

Referring to FIG. 5, assuming stem 5 overlaps stem 4 by at least 50% of its length, the counter c between stem 4 and stem 5 will be considered during the following steps of the invention. It doesn't matter that the overlap between stem 4 and stem 5 is less than 50% of the length of the longer stem 4. It is more than 50% of the length of the shorter stem 5. In FIG. 5, counters a, b, c, and d are associated with stems which are all sufficiently overlapping to meet the overlap criteria so that their counters will be included in the groups to be adjusted. Note that stems 2 and 3 do not overlap at all and thus have no counter between them. However, stems 3 and 4 have counter f and stems 1 and 3 have counter e.

The next factor to be considered in determining which pairs of stems form counters is to examine the extent of overlap for what is termed "shadow overlap". Referring to FIG. 5, to determine whether there is shadow overlap between stem 4 and stem 1, you compare what the hypothetical overlap would have been if stems 2 and 3 were not in between, with the aggregate length of the shadow cast on stem 1 by stems 2 and 3, using a light source the length of stem 4 shining towards stem 1. The light is assumed to be collimated, that is, a horizontal light casting projections or shadows of various stems or parts of stems. In FIG. 5, the hypothetical shadow cast by stem 4 on stem 1 is shown as $s_3$, the actual shadow on stem 1 from stem 2 is shown as $s_1$ and the actual shadow on stem 1 from stem 3 is shown as $s_2$. If the union of the actual shadows $s_1$ and $s_2$ is less than the shadow overlap constant times the length of the hypothetical shadow $s_3$, then stems 1 and 4 will be used to set counter h. One skilled in the art will recognize that the "shadow overlap" constant, like the "extent of overlap" constant, can take any of a range of values, taken to be 50% in this example. If the union of the actual shadows exceeds this fraction of the hypothetical shadow, stem 4 will not be considered to make up a counter with stem 1. Since it appears that the union of $s_1$ and $s_2$ is more than 50% of $s_3$, stems 1 and 4 are thus considered non-overlapping. Thus counter h between stems 1 and 4 is eliminated.

Looking at stems 4 and 6, however, assuming the light forming the shadow is projected from the shorter stem 4, the shadow cast on stem 6 by stem 5 is much less than 50% of the hypothetical shadow of stem 4 on stem 6 if stem 5 hadn't been in between. Therefore stems 4 and 6 form counter g. The shadows of non-stem regions, such as regions 7 and 8, are ignored in this determination.

Next these counters must be grouped into chains, starting with the longest chain. A chain of counters is a sequence of counters that goes from stem to stem, the stem which is the left side of one counter becomes the right side of the next. Referring to FIG. 5, stem 1 is the left side of counter a. Stem 2 is the right side of counter a, but also is the left side of counter b. Stem 4 is the right side of counter b and the left side of counter c. Stem 5 is the right side of counter c and the left side of counter d. Finally, stem 6 is the right side of counter d. Accordingly, stems 1-6 are a chain of stems and their intervening counters a-d are a chain of counters. Chains are always made as long as possible. Counters are added until there are no more stems to the right.

In order to determine whether this first chain of counters is the longest chain, that is, having the greatest number of counters, in the character shown in FIG. 5, one must look at all other possible counter chains. One other chain, for example, is made up of counters e, f, g and d; another of counters e, f, and g; another of counters a, b and g. Two chains have four counters and two chains have only three. The goal is to identify and process the longest chain first. If, as here, two chains are determined to have the same length, one can arbitrarily be chosen to be the chain to adjust. Preferably, the cumulative extent of overlap in each chain can be determined and the chain with greatest overlap can be adjusted first. In this example chain a, b, c, d was chosen for processing first.

As each chain is established, the next step in the method of the invention is to adjust the non-integral counter widths within that chain relative to other counter widths within the same chain, making selected counter widths equal to others in a manner to most faithfully reproduce the regularities of the desired character. In so doing, one must take scale information into consideration. If the scale at which the character is to be reproduced in display space is small, smaller differences in stem or counter widths can be very noticeable. On the other hand, if the scale is very large, small differences may not be so important or so noticeable to the eye. Accordingly, in determining how to adjust a given counter width within the chain, reference to scale information may be made.

Figure 4:
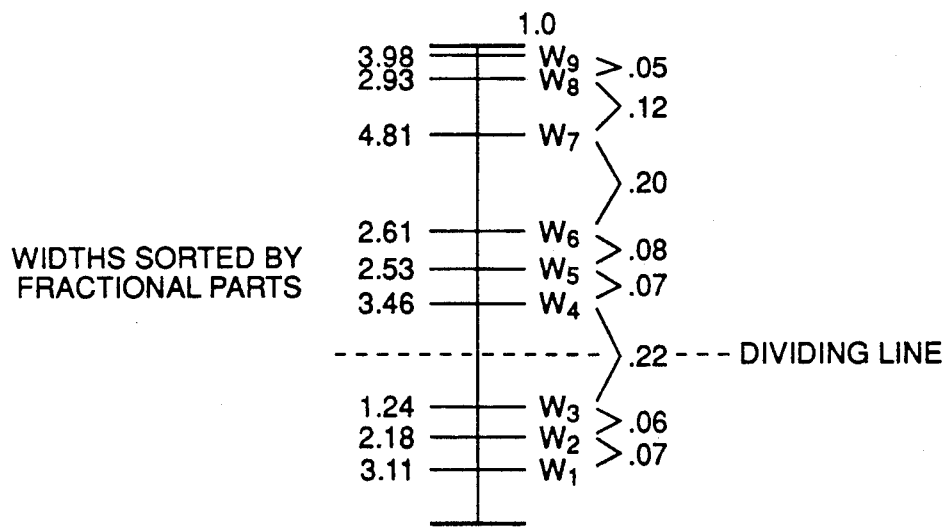
FIG. 4 is a graph showing the method of adjusting counter widths of the invention.

Referring specifically to FIG. 4, a graph is shown of nine non-integral counter widths which had been translated from character space to device space. The smallest width is 1.24 pixels and the largest is 4.81 pixels. These counter widths are labeled $w_1$ to $w_9$ in order of increasing size of the fraction portion of the width (ignoring the integer portion for the time being).

The display, which will show the character stems delineating these counters, can only display counter widths of integral numbers of pixels. Therefore the stems bordering each of these nine counters must be displayed on pixel grids rounded down or up to the nearest integer. The method of this invention is used to make a decision whether to round down or up. The method begins by deriving the deltas between these fractional portions of the counter widths, which will be called counter fractions, and arranging them in increasing order. As shown in FIG. 4, the eight deltas, in increasing order in fractional pixels, are 0.05, 0.06, 0.07, 0.07, 0.08, 0.12, 0.20 and 0.22. As a start, each of the nine counter fractions will be considered as its own group.

Next, it is necessary to establish a grouping threshold delta. In practice, a grouping threshold delta of about 7-25, preferably about 10, in character space has been found satisfactory. This threshold delta must be converted by the scale factor used to convert the character to device space. In the example of FIG. 4, assume the selected delta in character space resulted in a grouping threshold delta value of 0.30 pixels in device space. If deltas exceed the threshold delta, they are not grouped. In doing the groupings in order to make the rounding decision, one must start with the counter fraction having the lowest delta, 0.05, which is between counter fraction #8 of 0.93 pixel and counter fraction #9 of 0.98 pixels.

Initially each counter fraction is a "group". Thus we are really starting with the "group" comprising counter fraction #8 and the "group" comprising counter fraction #9. First we check to see if the delta between these groups exceeds the threshold delta. Clearly 0.05 is less than 0.30, so it does not. Then, since the delta is below the threshold delta, we group the higher counter fraction of the pair, which we will call $w_9$ with the lower counter fraction, $w_8$, and arbitrarily we identify this group by the lower fraction number, $w_8$.

Next, the next-lowest delta is considered, which is 0.06 between $w_2$ and $w_3$. Since 0.06 is less than 0.30, the threshold delta, $w_3$ is grouped with $w_2$ and called the $w_2$ group. The next lowest fraction is 0.07 between either $w_4$ and $w_5$ or between $w_1$ and $w_2$ (since they are equal, either one can be used first). $w_2$ is already a group. In comparing a group of more than one fraction with the threshold, the most extreme calculation must be used so as to as closely as possible approach the threshold or exceed it. Since $w_1$ is below both members of the $w_2$ group, the largest delta is obtained by using the higher $w_3$ fraction (0.24) of the $w_2$ group. $w_1 = 0.11$, so the maximum delta (0.24 − 0.11) is 0.13, which is still less than 0.30, so $w_1$ is grouped with the $w_2$ group, which can now be renamed the $w_1$ group, for its lowest member.

The next smallest delta is now the other 0.07 between $w_4$ and $w_5$. $w_4$ and $w_5$ are not yet a part of any group except their own. Since 0.07 again is less than 0.30, $w_5$ is grouped with $w_4$ and we will call this the $w_4$ group. The next lowest delta is 0.08 between $w_6$ and $w_5$. $w_5$ is part of the $w_4$ group and below $w_6$. Therefore the delta to be compared is between $w_6$ and $w_4$, which equals 0.15. Since 0.15 is less than 0.30, $w_6$ now joins the $w_4$ group.

The next lowest delta is 0.12 between $w_7$ and $w_8$. $w_8$ is part of the $w_8$ group, the farthest counter fraction of which from $w_7$ is $w_9$. $w_9 − w_7 = 0.17$ which is less than 0.3 and therefore $w_7$ becomes part of the $w_8$ group, which is renamed the $w_7$ group.

Now there are three groups, the $w_1$ group, the $w_4$ group and the $w_7$ group. The next smallest delta is 0.20 between $w_7$ and $w_6$. $w_7$ is part of the $w_7$ group and $w_6$ is part of the $w_4$ group. Comparing the extremes of each group, we compare $w_9$ to $w_4$, which is 0.52. Since 0.52 is greater than the threshold delta of 0.30, these groups are not combined. The same is true of the $w_4$ and $w_1$ groups, since their extreme delta is 0.40 which is greater than 0.30, so these groups cannot be merged. It is therefore desirable that the counters in each of these three groups must be rounded either up or down as a group. This will be explained below.

After grouping has been completed, as described above, a dividing line for rounding must be created between groups. All counter fractions above the dividing line will be rounded up and all those below the dividing line will be rounded down. Therefore it is desirable that the dividing line fall between groups and not within a group. To make the choice of dividing line, we first have to compute the ideal chain length. This is the distance from the leftmost stem of the leftmost counter in the chain to the rightmost stem of the rightmost counter in the chain, in device space, before any adjustments in stem or counter widths have been made. This represents the ideal length of the chain if we were not constrained to lining up stem edges on pixel boundaries.

We choose a dividing line for rounding such that the length of the chain after all stems and counters have been rounded is as close as possible to the above-calculated ideal length of the chain, while not splitting any groups. The overall length of the adjusted chain changes by one pixel each time a counter value is moved across the dividing line. Thus, by moving the dividing line, we can change the adjusted chain length until it is as close as possible to the ideal chain length. If the ideal dividing line found by this method is within a previously established group, then it should be moved either above or below the group in a direction which minimizes the number of counter fractions through which it must pass. Sometimes the magnitude of error introduced by moving the dividing line out of a group is too large to be tolerated. If the length of chain would have to change by more than +10% or −10% by moving the dividing line out of a group, then the dividing line is left within the group. If this happens, counters in the same group will end up being rounded in different directions.

This less desirable rounding effect can be minimized by the following actions. If the stems and counters are vertical, then the leftmost counters in the divided group are rounded down and rightmost counters in the group are rounded up. The leftmost counters are those first encountered in establishing a chain. If the stems and counters are horizontal, then the uppermost counters in the chain in the divided group are rounded down and the lower counters are rounded up. The uppermost counters are those encountered first if the chain had been established from the top down. Otherwise, the reverse is true. The exact number of counter fractions to be rounded down and up is chosen to minimize the difference between the adjusted chain length and the ideal chain length.

This process results in a pattern of counters that best approximates the ideal aesthetics of kanji characters. Thus in the example in FIG. 4, if we assume for the sake of brevity that all of the stems have 0 width, then the ideal chain length would be $3.98 + 2.93 + 4.81 + 2.61 + 2.53 + 3.46 + 1.24 + 2.18 + 3.11 = 26.85$ units.

If we rounded every counter fraction down, then the adjusted chain length would be 22 units. The difference between the ideal chain length and the minimum adjusted chain length is rounded to determine how many counter widths should be rounded up, 4.85 rounded to five in this example.

If we round five stems up, the highest five will be rounded up and the dividing line will fall between $w_4$ and $w_5$ which is within group $w_4$. We must try to move the dividing line out of the group. If we move it up, the adjusted chain length will be 25 but if we move it down, the adjusted length will be 28. If we move it down, there will be less of a difference between the adjusted chain length and the ideal chain length. Therefore, we move it down to be between $w_3$ and $w_4$. The adjusted chain length becomes 28. This is 4.2% more than the ideal chain length, and is acceptable, so the dividing line may remain between $w_3$ and $w_4$. Thus all the counters of group $w_1$ will be rounded down and the counters of group $w_4$ and $w_7$ will be rounded up.

Using the character of FIG. 5 as an example of counter width adjustment, the chain with the largest number of counters in FIG. 5 should be grouped first. As discussed above, the four counters a, b, c and d make up the longest chain 20 of four counters, as opposed to chain 21 which has only three, e, f, and g. Note that counter a has X-coordinates 15 and 27, giving it a width of 12 units. These are in character space. Counter b has a width of 13 units ($X_1 = 34$; $X_2 = 47$). Counter c ($X_1 = 56$; $X_2 = 68$) has a width of 12 units, the same width as counter a. Counter d ($X_1 = 77$; $X_2 = 140$) has a width of 63 units. If it is assumed that in device space, each unit in the X direction is equal to 0.2 pixels on the screen, the widths of counters a and c of 12 units in character space each correspond to 2.4 pixels in device space. Counter b, having a width of 13 units in character space, corresponds to 2.6 pixels in device space. Counter d having a width of 63 units in character space, corresponds to 12.6 units in device space.

Since it is well known that a display cannot show a fraction of a pixel, these counter widths must be adjusted in accordance with the invention. Since counters a and c have identical widths, they are automatically put into the same group, which we will call group A, by the grouping method of the invention, with a fractional width of 0.4. Since counters b and d have the same fractional width (0.6), they are put in the same group, which we will call group B. Group A is compared to group B, yielding a delta of 0.20 pixels. Assuming a threshold of 0.30, group B is therefore grouped with group A.

To compute a dividing line for rounding we first compute the ideal chain length. This will be the distance from the left of stem 1(X=8) to the right of stem 6(X=157) mapped into device space: 149×0.2=29.8. The minimum chain length is 28, the sum of the integer parts. The difference between the ideal and minimum chain length is 1.8, which rounds to 2, so two of the four chain widths should be rounded up. In order that the dividing line not split the sole group, group A (comprised of all four counter widths), we must round all the counters down or all counters up. If we round down we get an adjusted chain length of 28 (assume in this example that stems 1 and 2 have been rounded to 1 pixel, stem 4 to 3 pixels, stem 5 to 2 pixels and stem 6 to 4 pixels according to the method described above). If we round up we get an adjusted chain length of 32. There is slightlyless error if we round down. Therefore counters a, b and c are rounded down to 2 pixels, while d is rounded down to 12 pixels. This is done by moving the stem to the right of each counter to the left (since we are rounding down) by the amount of the rounding. In FIG. 5, stem 2 is moved 0.4 pixels to the left to decrease the width of counter a by 0.4 pixels. Stem 4 is moved 0.4+0.6, or 1 pixel to the left to adjust for the movement of stem 2 and to shorten counter b by 0.6 pixels. Accordingly, stem 5 is moved 0.4+0.6+0.4, or 1.4 pixels to the left, and stem 6 is moved 0.4+0.6+0.4+0.6 or 2 pixels to the left. Since the counter widths are adjusted to integral values by this method and the stem widths were adjusted to integral values by the method described above the stems and counters will now fall on integer, pixel boundaries.

Having adjusted both the stem widths and the counter widths in chain 20, as described above, it will be apparent that the widths of counters a, b, c, and d, as well as the exact locations of stems 1, 2, 4, 5 and 6 are determined. In grouping subsequent chains, fixed counters must be ignored. Accordingly, second chain 21 only has two counters, counters e and f. Counter g cannot be considered because its width has already been set by the sum of counters c and d plus the width of stem 5 during the adjustment of chain 20.

During the above process of stem width adjustment, consideration has to be given to other aspects of the character which are not part of any stems. In FIG. 5, theses are character regions 7 and 8. Note that region 7 is tangential to stem 4 and region 8 is near stem 6 in the counter g area between stems 4 and 6. These regions also must be adjusted as the stems surrounding them are moved, as described above. Both of these regions 7 and 8 fall within the space defined by counter g. Accordingly, as counter g is moved, either laterally or by stretching or shrinking it, these regions are moved laterally, stretched or shrunk accordingly. Thus, in the example discussed earlier, where stem 6 was moved to the left by two pixels and stem 4 was moved to the left one pixel, counter g is thus moved to the left by one pixel and shrunk by one pixel. Therefore, regions 7 and 8 are moved to the left by one pixel and shrunk proportionately.

Figure 6:
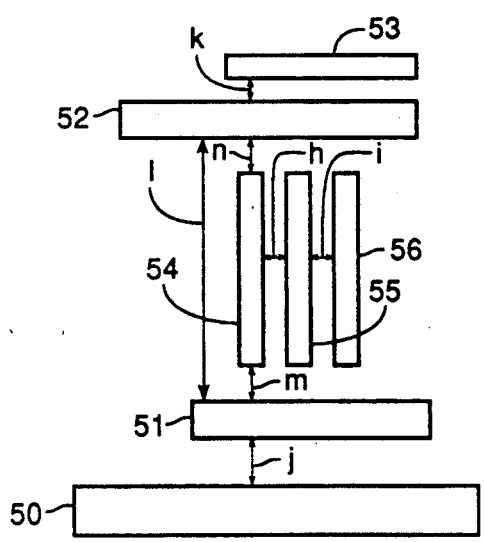
FIG. 6 is another representative, fictitious kanji character having both vertical and horizontal stems and counters.

Referring to FIG. 6, another fictitious kanji character is shown. This character is made up of four horizontal bars 50, 51, 52 and 53 and three vertical bars 54, 55 and 56. Counters h and i between vertical bars 54 and 55, and 55 and 56, respectively, will be adjusted to the manner discussed above for vertical counters. Horizontal stem pairs 50 and 51, and 52, and 53, have a significant overlap with respect to each other (100%). In determining whether counter 1 is a counter within the chain of counters j and k, the shadow percentage between stems 51 and 52 needs to be considered. Let us assume that this shadow, viewed from the shorter stem 51, is more than 50% of the hypothetical shadow, and thus counter l is eliminated. However, counters j, m, n, and k make up another possible chain if you look at stems 54, 55 and 56 from a horizontal perspective where they become very wide, short stems. All perspectives identified as stems in the hints for the character must be used as stems for the purposes of checking whether or not to include counters within chains.

There is a 100% overlap in the horizontal direction between stem 54, viewed as a wide, short stem, and stems 51 and 52. Obviously, stem 51 overlaps the ends of stem 50 by 100%, as does stem 52. Thus the longest horizontal chain of counters in FIG. 6 is comprised of counters j, m, n, and k. Therefore horizontal counters j, k, m and n are adjusted as a single chain in the same manner described above for the vertical counters.

As will be understood by those skilled in the art, many changes in many aspects of the process described above may be made by the skilled practitioner without departing from the spirit and scope of the invention, which should be limited only as set forth in the claims which follow.

We claim:

1. A method for displaying characters having regularities, said characters being scaled to a device on which they are to be displayed and being defined at least in part by pluralities of vertical and horizontal stems which define counters therebetween, the widths of which are measured by a number of pixels which may be integral or fractional, comprising:

grouping counters of a character defined by a first plurality of stems into a first chain of counters;

determining the widths of said counters within said first chain to provide counter width information;

adjusting the widths of certain counters within said first chain relative to other counter widths of counters within said first chain using only said counter width information and rounding up or down the counter widths of counters within said first chain which are not an integral number of pixels to an integral number of pixels in a manner to most faithfully reproduce the character to be displayed, said adjustment being carried out on the counters within each chain, the width of each of said counters having an integral and a fractional portion, by grouping said counters according to said fractional portions of their widths and rounding said fractional portions up or down to integers according to the grouping in which they fall, thereby creating a dividing line between the grouping rounded up and the grouping rounded down; and grouping the counters in the character which are not in said first chain into one or more chains and rounding selected counter widths which are not an integral number of pixels, chain by chain, to counter widths having an integral numbers of pixels.

2. The method for displaying characters of claim 1 further characterized by, in instances where the dividing line between the fractional portions rounded up and rounded down lies within a previously established group of counters, the fractional portions of the counters within the group of counters which first occurs on the chain are rounded down and the fractional portions of the counters within the group of counters which later occurs on the chain are rounded up.

3. The method for displaying characters of claim 1 further characterized by the additional step, before the steps of claim 1, of separating said pluralities of horizontal and vertical stems according to their stem widths into groups bounded by integral stem widths and rounding the stem widths which are not integral within one or more of said groups relative to the other stem widths within that same group in a manner to most faithfully reproduce said regularities of the desired character.

4. A method for displaying characters having regularities and being scaled to the device on which they are to be displayed, said characters being defined in part by vertical stems having regularities and separated by vertical counters, and by horizontal stems having regularities and separated by horizontal counters, said stems and said counters being measured by a number of pixels which may be integral or fractional, the stems being derived from the definition of said character, comprising:

grouping said vertical counters and said horizontal counters into separate chains, respectively, of vertical and horizontal counters;

as each chain is determined, starting with the chain with the most counters, adjusting the counter widths within that chain relative to other counter widths within the same chain, and rounding the counter widths within said chain which are not an integral number of pixels up or down to an integral number of pixels in a manner to most faithfully reproduce said regularities of said character.

5. The method for displaying characters of claim 4 further characterized by the additional step, prior to the steps of claim 4, of separating the stems of said character into groups of horizontal and vertical stems and adjusting the widths of said stems within one or more of said separated groups relative to the widths of other stems within that same group in a manner to most faithfully reproduce said regularities of the stems of said character.

6. The method for displaying characters of claim 4 further characterized by the additional step, prior to the steps of claim 4, of separating the stems of said character as scaled to said device on which the character is to be displayed into groups of horizontal and vertical stems and rounding stem widths which are not an integral number of pixels within one or more of said separated groups relative to the other stem widths within that same group in a manner to most faithfully reproduce said regularities of the stems of said character.

7. A method for displaying characters having regularities, said characters being scaled to a device on which they are to be displayed and being defined at least in part by pluralities of vertical and horizontal stems which define counters therebetween, the widths of which are measured by a number of pixels which may be integral or fractional, comprising:

grouping counters of a character defined by a first plurality of stems into a first chain of counters;

adjusting the widths of certain counters within said first chain relative to other counter widths of counters within said first chain and rounding up or down the counter widths of counters within said first chain which are not an integral number of pixels to an integral number of pixels in a manner to most faithfully reproduce the character to be displayed; and grouping the counters in the character which are not in said first chain into one or more chains and rounding selected counter widths which are not an integral number of pixels, chain by chain, to counter widths having an integral numbers of pixels, said adjustments being carried out on the counters within each chain, the width of each of said counters having an integral and a fractional portion, by grouping said counters according to said fractional portions of their widths and rounding said fractional portions up or down to integers according to the grouping in which they fall, thereby creating a dividing line between the grouping rounded up and the grouping rounded down.

8. The method for displaying characters of claim 7 further characterized by, in instances where the dividing line between the fractional portions rounded up and rounded down lies within a previously established group of counters, the fractional portions of the counters within the group of counters which first occurs on the chain are rounded down and the fractional portions of the counters within the group of counters which later occurs on the chain are rounded up.

9. The method for displaying characters of claim 7 further characterized by the additional step, before the steps of claim 7, of separating said pluralities of horizontal and vertical stems according to their stem widths into groups bounded by integral stem widths and rounding the stem widths which are not integral within one or more of said groups relative to the other stem widths within the sam group in a manner to most faithfully reproduce said regularities of the desired character.

* * * * *

UNITED STATES PATENT AND TRADEMARK OFFICE
CERTIFICATE OF CORRECTION

PATENT NO. : 5,050,103

DATED : September 17, 1991

INVENTOR(S) : Stephen N. Cshiller et al

It is certified that error appears in the above-indentified patent and that said Letters Patent is hereby corrected as shown below:

| | | |
|---|---|---|
| Col. 01, line 59 | delete "it" | insert --fit-- |
| Col. 05, line 14 | delete "w:" | insert --w,-- |
| Col. 05, line 68 | after "2.32," | insert --it must be-- |
| Col. 07, line 68 | delete "counters e, f, g" | insert --counters e, f, c-- |
| Col. 11, line 34 | delete "slightlyless" | insert --slightly less-- |
| Col. 12, line 14 | delete "to" | insert --in-- |
| Col. 14, line 58 | delete "sam" | insert --same-- |

Signed and Sealed this

Twenty-eighth Day of June, 1994

Attest:

BRUCE LEHMAN

*Attesting Officer*     *Commissioner of Patents and Trademarks*